US006337024B1

(12) United States Patent
Hammonds

(10) Patent No.: US 6,337,024 B1
(45) Date of Patent: Jan. 8, 2002

(54) CHLORINATION APPARATUS AND METHOD

(75) Inventor: Carl L. Hammonds, Humble, TX (US)

(73) Assignee: Hammonds Technical Services, Inc., Houston, TX (US)

( * ) Notice: Subject to any disclaimer, the term of this patent is extended or adjusted under 35 U.S.C. 154(b) by 0 days.

(21) Appl. No.: 09/616,149

(22) Filed: Jul. 13, 2000

Related U.S. Application Data

(60) Provisional application No. 60/143,567, filed on Jul. 13, 1999.

(51) Int. Cl.[7] .................................................. C02F 1/00

(52) U.S. Cl. .......................... 210/739; 137/1; 137/268; 210/123; 210/137; 210/198.1; 210/749; 210/754; 422/264; 422/274; 422/278

(58) Field of Search .......................... 210/97, 137, 143, 210/169, 198.1, 206, 754, 121, 123, 749, 739; 137/268, 1; 422/261–282; 239/310

(56) References Cited

U.S. PATENT DOCUMENTS

| | | | | |
|---|---|---|---|---|
| 2,989,979 A | | 6/1961 | Karlson | |
| 3,456,678 A | | 7/1969 | Wright | |
| 3,612,080 A | | 10/1971 | Schneider et al. | |
| 3,807,434 A | | 4/1974 | Rasmussen et al. | |
| 3,846,078 A | | 11/1974 | Brett | |
| 3,864,090 A | | 2/1975 | Richards | |
| 4,026,673 A | | 5/1977 | Russo | |
| 4,179,047 A | | 12/1979 | Abdoo | |
| 4,199,001 A | | 4/1980 | Kratz | |
| 4,250,910 A | | 2/1981 | King | |
| 4,420,394 A | | 12/1983 | Lewis | |
| 4,548,228 A | | 10/1985 | Moore et al. | |
| 4,584,106 A | | 4/1986 | Held | |
| 4,759,907 A | | 7/1988 | Kawolics et al. | |
| 4,842,729 A | | 6/1989 | Buchan | |
| 4,908,190 A | | 3/1990 | Maglio et al. | |
| 4,957,708 A | | 9/1990 | Dutton et al. | |
| 5,076,315 A | | 12/1991 | King | |
| RE33,861 E | | 3/1992 | Zetena | |
| 5,201,339 A | | 4/1993 | Buchan et al. | |
| 5,326,165 A | | 7/1994 | Walthall et al. | |
| 5,384,102 A | * | 1/1995 | Ferguson et al | 422/264 |
| 5,393,502 A | | 2/1995 | Miller et al. | |
| 5,419,355 A | | 5/1995 | Brennan et al. | |
| 5,427,748 A | * | 6/1995 | Wiedrich et al. | 422/264 |
| 5,470,151 A | | 11/1995 | Walthall et al. | |
| 5,507,945 A | | 4/1996 | Hansen | |

(List continued on next page.)

*Primary Examiner*—Joseph W. Drodge
(74) *Attorney, Agent, or Firm*—Gary L. Bush; Andrews, Kurth, Mayor, Day, Caldwell & Keeton, LLP

(57) ABSTRACT

Apparatus and method for dissolving chemical tablets for creating a variable rate of chemical dissolution in a stream of constant flow rate of untreated liquid, especially water. The apparatus includes a housing in which a container is placed. The container includes a sieve plate or perforated grid which separates the container into an upper chamber in which chemical tablets are stored and a lower mixing chamber. A collection reservoir is defined in an annular outside the container wall and inside of the housing. Several arrangements are illustrated by which a vortex of liquid is generated of controllable variable intensity in the lower or mixing chamber thereby creating uneven liquid pressure beneath the perforated grid as a function of radial distance. As a result, fluid passes aggressively through outer radial perforations or holes in the grid and which impinge on the chemical tablets stacked on the grid. The liquid circulates in the upper chamber from the outward radial position toward the center of the grid plate, while eroding the tablets, and returns to the mixing chamber. A portion of the liquid exits into the collection reservoir. Liquid communication also exits from a hole in the bottom of the lower mixing chamber, which is open to the collection reservoir. Varying the intensity of the vortex varies the rate of chemical dissolution, yet the flow rate of liquid through the apparatus is constant.

32 Claims, 6 Drawing Sheets

U.S. PATENT DOCUMENTS

| | | | |
|---|---|---|---|
| 5,536,479 | A | 7/1996 | Miller et al. |
| 5,580,448 | A | 12/1996 | Brandreth |
| 5,666,987 | A | 9/1997 | Combs |
| 5,810,043 | A | 9/1998 | Grenier |
| 5,932,093 | A | 8/1999 | Chulick ................................ |

* cited by examiner

CHLORINATION APPARATUS AND METHOD

CROSS REFERENCE TO RELATED APPLICATION

This non-provisional application claims priority under 35 USC 119(e) from Provisional Application 60/143,567 filed on Jul. 13, 1999.

BACKGROUND OF THE INVENTION

1. Field of the Invention

This invention relates to an apparatus and method for dissolving "biscuits" or "tablets" or "pucks" containing chemicals into a liquid solution and more particularly a method of precisely controlling the dissolution rate of water purification tablets into solution. In addition, the invention provides for a system and method for either continuous or intermittent dispensing of the dissolved chemical into a flowing line, either pressurized or unpressurized, in a controlled manner for generating a specific concentration of dissolved chemical in water, and using the chemical solution to maintain an overall residual level of the dissolved chemical in the flowing line.

2. Description of Prior Art

Prior arrangements used to dissolve solid chemical tablets into a liquid solution are based upon the principle of liquid dissolution or physical erosion in order to break the solid tablets so that the chemical of the tablets is dissolved into solution. Most forms of solid chemical tablets are pressed into geometric shapes such as various size tablets of rectangular or cubical forms, which are bound together by using a combination of various fillers and binders. It has been necessary to sometimes use a combination of physical erosion and liquid dissolution to accomplish the dissolving process.

A characteristic of chemical tablets is an inherent inconsistency in chemical strength, because during manufacture of the chemical tablets, a mixture is first produced of dry granulated chemicals, which may contain various levels of inert fillers and binders. The dry mixture is then mixed with liquid to form a chemical mixture having a "putty"-like consistency. The chemical mixture is then pressed into various shapes. Since combinations of dry and liquid products are difficult to blend evenly prior to the pressing and forming process, the final tablet often varies in consistency and strength from batch to batch or even tablet to tablet. Additionally, temperature, age, relative humidity and level of pressing pressure all affect the density, solubility and final chemical assay strength of each individual solid geometric tablet. This inherent inconsistency of the dissolution characteristics of chemical tablets such as containing calcium hypochlorite makes precise and even dissolution difficult whether the dissolution process is made a "batch" at a time, or constantly as in the case of a continuous feed process. Because chemicals such as calcium hypochlorite, which when dissolved produce chlorine in the water, are often used to achieve and maintain minute levels of residual chlorine strength with a given process, (for example, water purification), and since chlorine demands within the various processes often vary, it is extremely difficult to maintain consistent performance with existing erosion dissolution apparatus and methods.

Previous equipment designed to dissolve or erode solid chemical tablets typically employ a combination of (1) variable flow rates of water across the tablets and (2) variable area exposure of the tablets to the water. U.S. Pat. No. 5,427,748, shows a chlorinator which uses a variable flow-rate of water, which correspondingly raises the level of water within the chlorinator and therefore exposes more of the surface area of the tablets in order to dissolve more chemical such as calcium hypochlorite. This method passes a variable volume of untreated water through the chlorinator in order to dissolve the desired amount of chlorine into solution which is then discharged by gravity either into an open process tank or is placed into a solution tank where it is mixed with additional untreated water to form a final solution prior to being pumped into a pressurized process line. Untreated water is passed through the feeder only one time, with no recirculation of treated water across the chemical tablets within the process. The gravity chlorinator of U.S. Pat. No. 5,427,748 delivers more or less chemical per unit time by adjusting the volume of liquid passing through the unit which correspondingly raises or lowers the water level within the chlorinator and therefore causes the water to contact more or less surface area of the chemical tablets. When the system is inactive, water drains by gravity from the feeder, leaving the tablets free of water contact.

A problem exists with the method and apparatus of dissolution of U.S. Pat. No. 5,427,748 in that because tablets are placed randomly into the feeder column of the chlorinator, the geometric shape of the chemical tablets relative to the direction of water flow as it passes up through the chlorinator produces varying degrees of dissolution. Water contacting a tablet at a perpendicular angle has more eroding capacity than the same volume of water contacting the side of the tablet at a very slight angle. Because the tablets are fed by gravity as the tablets within the flowing water are dissolved, the random position of the tablets within the stored column are randomly oriented in the feeder and are in a constant state of change, therefore producing inconsistent rates of erosion and dissolution as water flows over them. Because of the variation in erosion rates, the water flow rate may require constant adjustment through the feeder in order to maintain consistent solution strength.

Another problem with the method and apparatus of U.S. Pat. No. 5,427,748 is that with very low flow rates and erosion rates, the tablets tend to bridge. Bridging is a condition where the chemicals and fillers are eroded away while leaving a shell of binder and other solids. The remaining shell in one or more tablets tends to create a "bridge" that prevents the upper undesolved tablets, which are supported from the bridge, from migrating or falling into the dissolving water stream. This phenomenon reduces the amount of actual chemical dissolution over a period of time, therefore making the treated solution vary in dissolved chemical strength. A chemical such as calcium hypochlorite which is used to disinfect water is typically injected at very low concentrations. Consistent dissolution is critical. As an example, in potable water treatment, final concentrations in the process line are maintained at levels between one (1) and two (2) parts per million. Often, specifications call for fractional parts per million, such as 1.5 or 1.6 ppm making it more difficult to maintain desired levels when dissolution is not consistent.

Varying the flow rate of water through the U.S. Pat. No. 5,427,748 chlorinator controls the rate of dissolution. To make changes in flow rate requires the operation of a flow control valve either manually or by some automatic means such as a motorized proportioning valve. Since the dissolving water is "single pass-through", the resulting output of the system must also be altered with each change in chemical demand. Since volumes of water created through the process are typically large, centrifugal pumps are normally chosen for the injection process. Centrifugal pumps are sized to rather narrow ranges of flow performance at specific pressures, making varying their output difficult. These changes can be complicated when a pump is utilized to inject the dissolved solution into a pressurized line. Due to inconsistencies in the chemical concentration of the tablets, the physical characteristics of the tablets, and of the process as described above, changes in chemical demand by the process requires perpetual adjustments of the flow rate of the system.

Altering the volume of flow through a system is often difficult, since in many cases the volume available to the feeder is fixed.

SUMMARY OF THE INVENTION

This invention has particular application in the area of liquid treatment, especially water, where disinfection chemicals including chlorine bearing chemicals such as calcium hypochlorite, di-chlorisocyanurate, tri-chlorisocyanurate, or bromine bearing chemicals, and also chemicals used for the removal of chlorine or bromine and various other products used within the water treatment industry, must be introduced in order to disinfect or otherwise treat the water for either consumption or discharge after use. Such processes are used to treat drinking water, water for swimming pools, water for cooling towers, wastewater, and sewage. Within this application, chlorine must be maintained in solution at fractional levels from one-half (0.5) parts per million to solution strengths into the single digit concentration levels such as 1.0–5.0 percent concentration (e.g. 10,000 to 50,000 parts per million). The invention provides the unique capability of producing any concentration level from a high volume-low concentration solution to a low volume-high concentration solution.

The present invention is embodied in an apparatus and method for precisely controlling the dissolution of solid chemical tablets and preparing the resulting solution for injection into a process stream. The process of dissolving solid chemical tablets is accomplished by passing a fixed rate of dissolving fluid such as water through the feeder. With a recirculating stirring action of the dissolving fluid through the feeder, the rate of dissolution can be varied and precisely controlled without varying the total volume of fluid passing through the feeder. The recirculation and mixing action is accomplished through one of several alternative arrangements and methods.

BRIEF DESCRIPTION OF THE DRAWINGS

The objects, advantages, and features of the invention will become more apparent by reference to the drawings which are appended hereto and wherein like numerals indicate like parts and wherein illustrative embodiments of the invention are shown, of which.

DESCRIPTION OF EMBODIMENTS OF THE INVENTION

Figure 1:
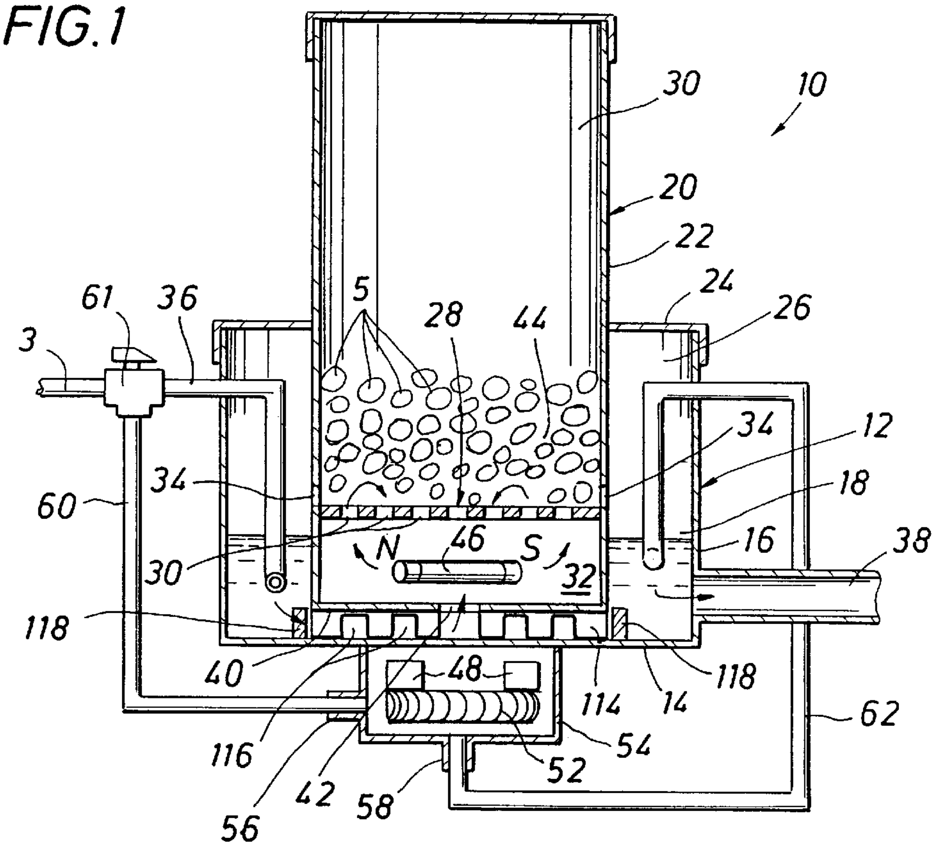
FIG. 1 illustrates schematically the apparatus of the invention embodied in a manually controlled, magnetically coupled stirring bar arrangement, driven by a portion of inlet liquid, for producing a vortex of treating liquid which passes over chemical tablets via outer radial holes and a portion returns via radial inner holes in a constant flow rate system.

In a first arrangement of the apparatus 10 of the invention, FIG. 1 illustrates a container 20 with side walls 22. The container 20 is divided into an upper chamber 30 and a lower or mixing chamber 32 by means of the grid or "sieve plate" 28 which is supported from the side walls 22. The container 20 is preferably cylindrical in shape. It is supported within a housing 12 by means of a hollow ring 114 which is secured to the bottom 40 of the container 20. The housing 12 may be a circular or rectangular enclosure. The ring 114 has radial holes 116. The bottom of the container 40 also includes a hole 42 for liquid communication between a collection reservoir 26 and the lower or mixing chamber 32. The container 20 is centered on the base 14 of the housing 12 by means of a centering ring 118. The housing 12 includes a lid 24 connected to the side walls 22 of the upper chamber 30 of the container 20. The collection reservoir 26 is defined in the housing cavity 18 by walls 16 and base 14 of housing 12 and radially outwardly of the side walls 22 of the container 20 and above bottom 40. Radial holes 34 are preferably placed in the side walls 22 of container 20 at a position below the level of liquid of the collection reservoir 26.

The apparatus 10 includes a free-floating stirring bar 46 positioned in a lower or "mixing" chamber 32 beneath the perforated shelf or "sieve plate" or "grid" 28 on which the chemical tablets 5 are stacked. The stirring bar 146 includes two magnets N and P (or a single magnetic bar with ends which are oppositely polarized) of opposing polarity. A "turbine" 52 coupled to magnetic drive bar 48, which includes a second set of opposing polarity magnets, is located beneath the mixing chamber 32. When the turbine is rotated, magnetic coupling of the stirring bar 46 and the drive bar 48 causes the stirring bar 46 inside the mixing chamber 32 to create a circular movement of fluid that has sufficient energy to raise the level of liquid up in a vortex through the grid 28. The vortex resembles a hollow cylinder of water with water rotating tangentially to the cylindrical walls. Water from the vortex enters the grid 28 from radially outer perforation holes 30 in the grid and impinges on the lower level of chemical tablets 5 stacked thereon within storage cylinder or container 20. Water returns to the mixing chamber 32 via radially inner holes in the grid 28.

Control of the height of the vortex of liquid of the lower mixing chamber 32, and the quantity of water passing over and impinging on the chemical tablets 5 is accomplished by means of a three way valve 61 which diverts a portion of the incoming untreated liquid from inlet 3 via a diverting line 60 and through a turbine 52, which turns the magnetic drive bar 48. A portion of untreated liquid enters collection chamber 26 via line 36. Untreated liquid out of the turbine is returned via turbine output fluid line 62 to the collection reservoir or tank 26. With the circulation of fluid up through the perforated shelf and impinging contact with the chemical tablets 5, a portion of the fluid carrying dissolved chemical passes back into the mixing chamber 32 below the perforated shelf 28 to be part of the "treating solution". A portion of the treating solution continues to recirculate and be mixed with incoming untreated water. Another portion of the treating solution is output via radial holes 34 in side walls 22 of container 20 or via hole 42 into the collection reservoir 20. Treated liquid from collection reservoir 26 is output via outlet 38 by gravity flow or by means of a pump for pressurized system applications as described below.

The control of the recirculation of treating solution, by means of the three way diverting valve 61, makes it possible to vary the rate of dissolution of tablets 5 within the container 20 without changing the flow rate of water passing through the apparatus 10. In other words, unlike in prior systems, the flow rate of untreated water input to the collection reservoir 26 (e.g., from inlet 3 as applied to collection reservoir 26 from the three way valve 61, line 36, and from the turbine output fluid line 62) is the same as the flow rate of treated solution water via the output line 38, and yet a variable output of chemical concentration of treated water is achieved. The arrangement and method of the first embodiment of the invention is powered and controlled by the flow of a fixed volume of water entering into and being recirculated to various degrees, as controlled by the position of the three way diverting valve 61, through the mixing chamber 32.

Figure 2:
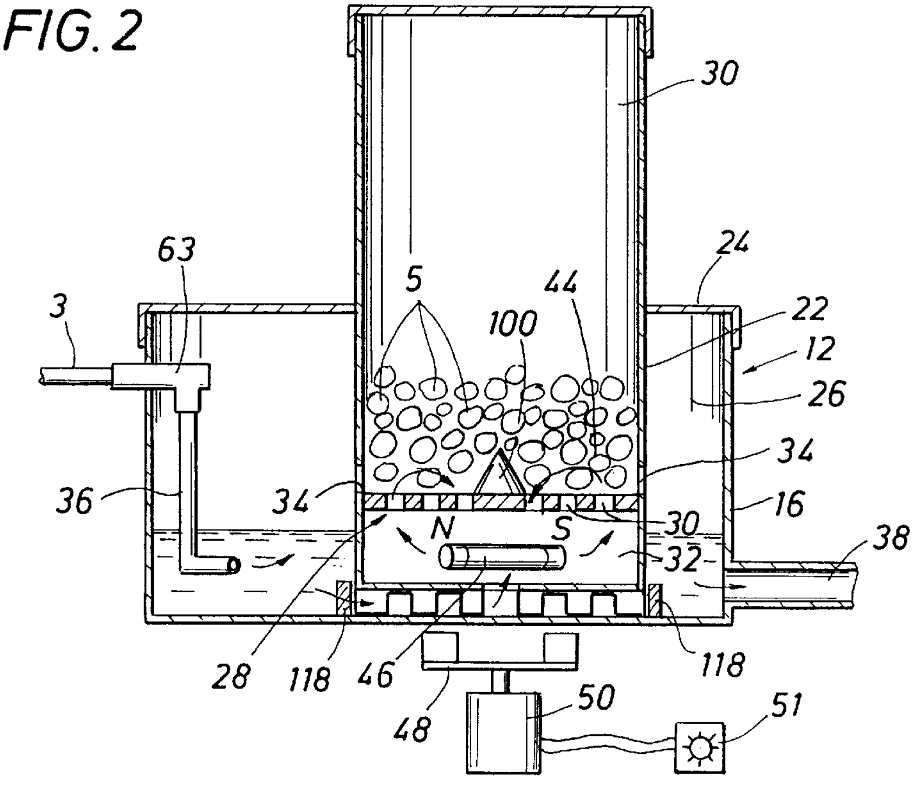
FIG. 2 illustrates a schematic diagram of an alternative apparatus of the invention, similar to the apparatus of FIG. 1, but having a variable speed motor which turns magnetically coupled mixing bars.

A second embodiment of a constant flow rate, variable chemical concentration output arrangement, as illustrated in the schematic diagram of FIG. 2, provides a variable speed motor 50, manually controllable by a controller 51, to turn the driving magnetic bar 48 located outside the mixing chamber 32. Again, the flow rate of liquid via the untreated liquid inlet 3 is the same as the flow rate of treated water output via outlet 31. The manually controlled variable speed motor 50, controllable by means of controller 51, controls the level of mixing, and therefore the rate of dissolution of chemical tablets in the liquid dissolving zone 44 in the upper chamber 30 and therefore the amount of dissolved chemical from tablets 5 in the constant flow rate of liquid exiting from liquid collection reservoir 26.

Also illustrated in FIG. 2 is a deflector 100 of a cone shape mounted on the center of grid 28, which causes tablets 5 to fall radially away from the longitudinal axis of the grid 28 in order to prevent bridging of the tablets as they are impinged on and dissolved by the vortex liquid column which enters via the radially outward perforations or holes of grid 28 and which partially returns via radially inward holes. A portion of treated fluid is exchanged via radial holes 34 of side walls 22 with collection reservoir 26.

A float valve 63 is connected between untreated fluid input line 3 and collection chamber inlet line 36. Float 65 on the liquid in collection reservoir 26 cuts off the input flow if the liquid rises past a predetermined position. Constant flow of treated water via outlet 38 is maintained.

Figure 3:
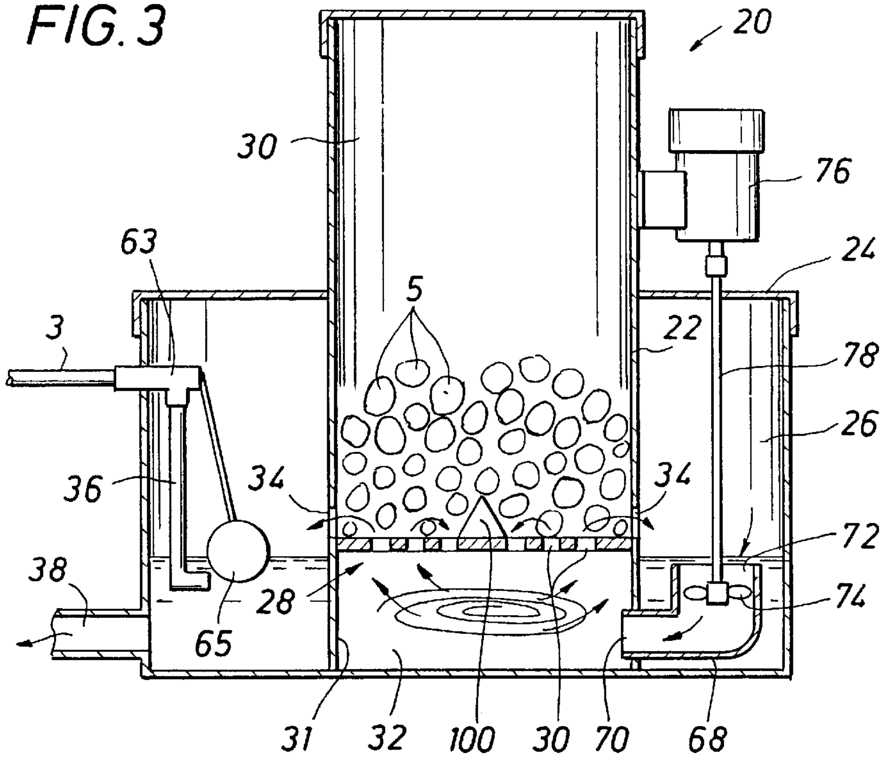
FIG. 3 illustrates an alternative arrangement of the invention whereby a liquid vortex in a mixing chamber is created by a variable speed motor which drives a mixing propeller which forces liquid tangentially into the mixing chamber in a constant flow rate system.

Another embodiment of the invention as illustrated schematically in FIG. 3, provides a manually controlled variable speed motor 76 to drive a propeller 74 in a pipe 68 which has an outlet 70 into lower or mixing chamber 32 and an inlet 72 in collection reservoir 26. The outlet 70 is directed tangentially to the wall 31 of the mixing chamber 32 to move the liquid in an alternative way for producing the circulating water in the mixing chamber in order to vary the concentration of the solution while using a fixed rate of flow through the system. The circulated fluid enters the lower chamber 32 tangentially, so as to create a vortex which forces fluid vertically up along the outside wall of the mixing chamber 32 (in the shape that resembles a hollow cylinder) where it enters the upper chamber 30 via outer radial holes 30 of perforated shelf 28 on which chemical tablets 5 are stacked. A portion of the water returns to the mixing chamber 32 via radially inner holes in the perforated shelf or grid 28. Another portion returns to the liquid of the collection reservoir via holes 34 in the wall 22 of the container 20. Treated water is output via outlet 38 from the bottom of the collection reservoir 26. A float valve 63 arrangement is provided similar to that of FIG. 2.

Figure 4:
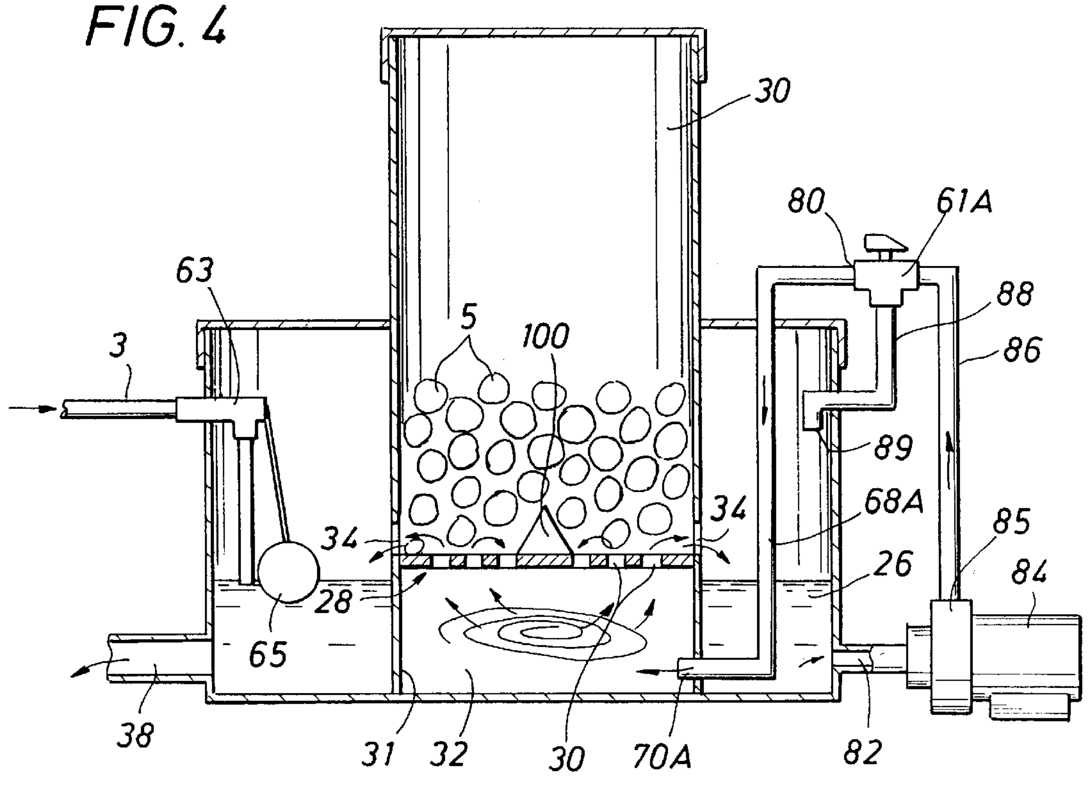
FIG. 4 illustrates an alternative arrangement, similar to that of FIG. 3, but with a manual valve which controls the amount of water to the mixing chamber by means of a pump substituted for a variable speed motor and mixer.

FIG. 4 schematically illustrates another alternative embodiment of the invention which utilizes a pump 84, which acts to re-circulate the liquid in the same manner as with the S magnetic stirring bar 46 of FIGS. 1 and 2, and the mixing propeller 74 of FIG. 3. All methods and arrangements of circulating the water as described above provide a mixing chamber 32, a perforated plate or grid 28 and means for producing vortex water action which combine to recirculate a portion of the fluid from the mixing chamber to flow across or impinge against treating chemical tablets supported by the perforated plate.

Figure 5:
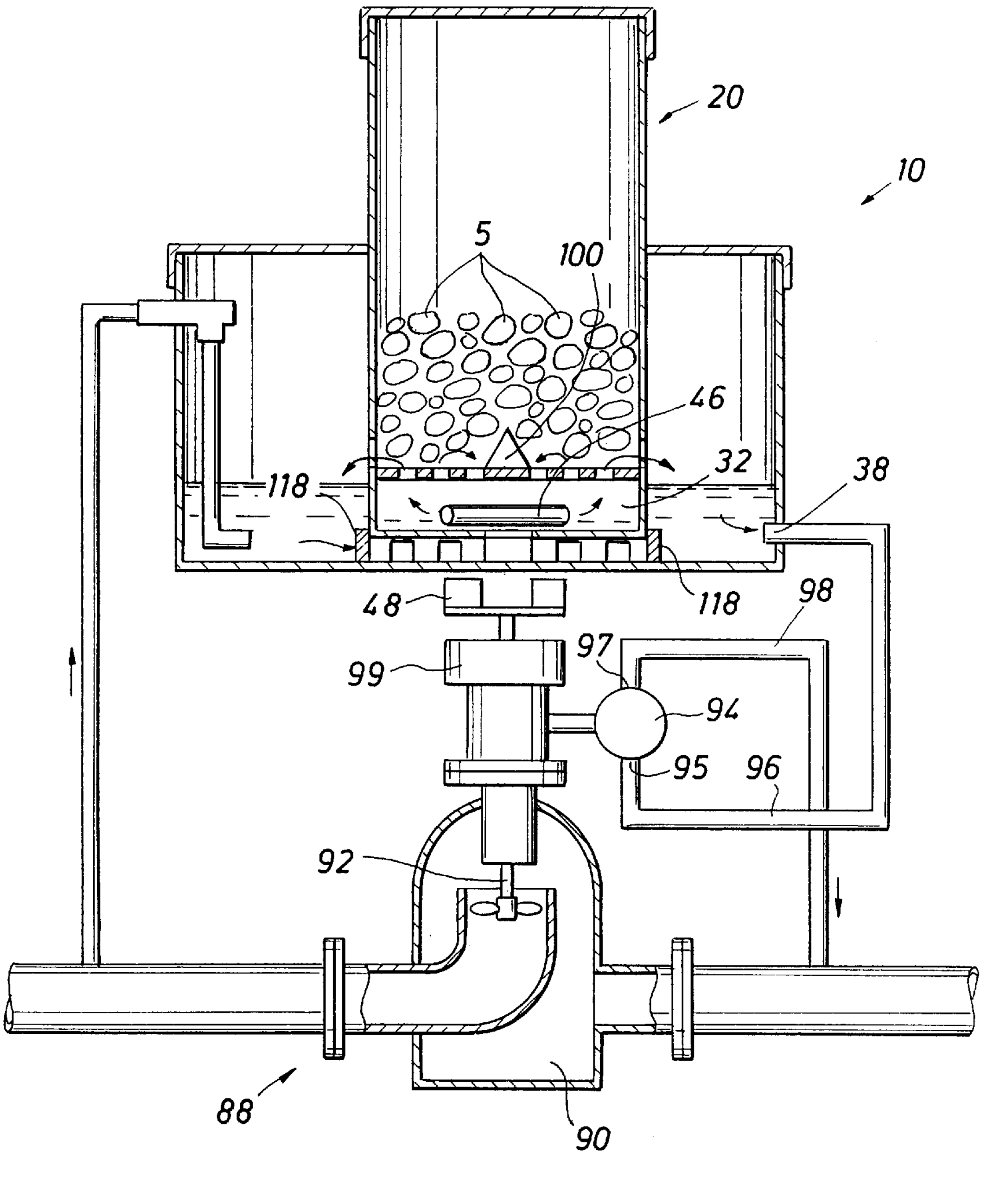
FIG. 5 illustrates an alternative embodiment of the invention where a fluid driven turbine turns a magnetic stirring bar for creation of a vortex of the feeder and simultaneously turns a positive displacement injection pump for injecting treated water back into the process line, such that dissolution rate is proportional to the flow rate of water in the process lines.

FIG. 5 illustrates a fluid driven turbine 90 which powers both the magnetic stirring bar 46 of mixing chamber 32 of container 20 and a positive displacement injection pump 95 used to inject treated fluid back into the process line. A variable speed gear 99 provides the coupling between shaft 92 of the turbine power driver 90 with the magnetic drive bar 48 and the injection pump 95. The arrangement of FIG. 5 provides for variable flow rate and chemical dissolution which is proportionate-to-flow with injection of treated solution via pipes 96, 98 to flow line 88 in remote areas where there is no electric power. A similar version of this arrangement could include a paddle wheel type driver for surface drive applications.

Figure 6:
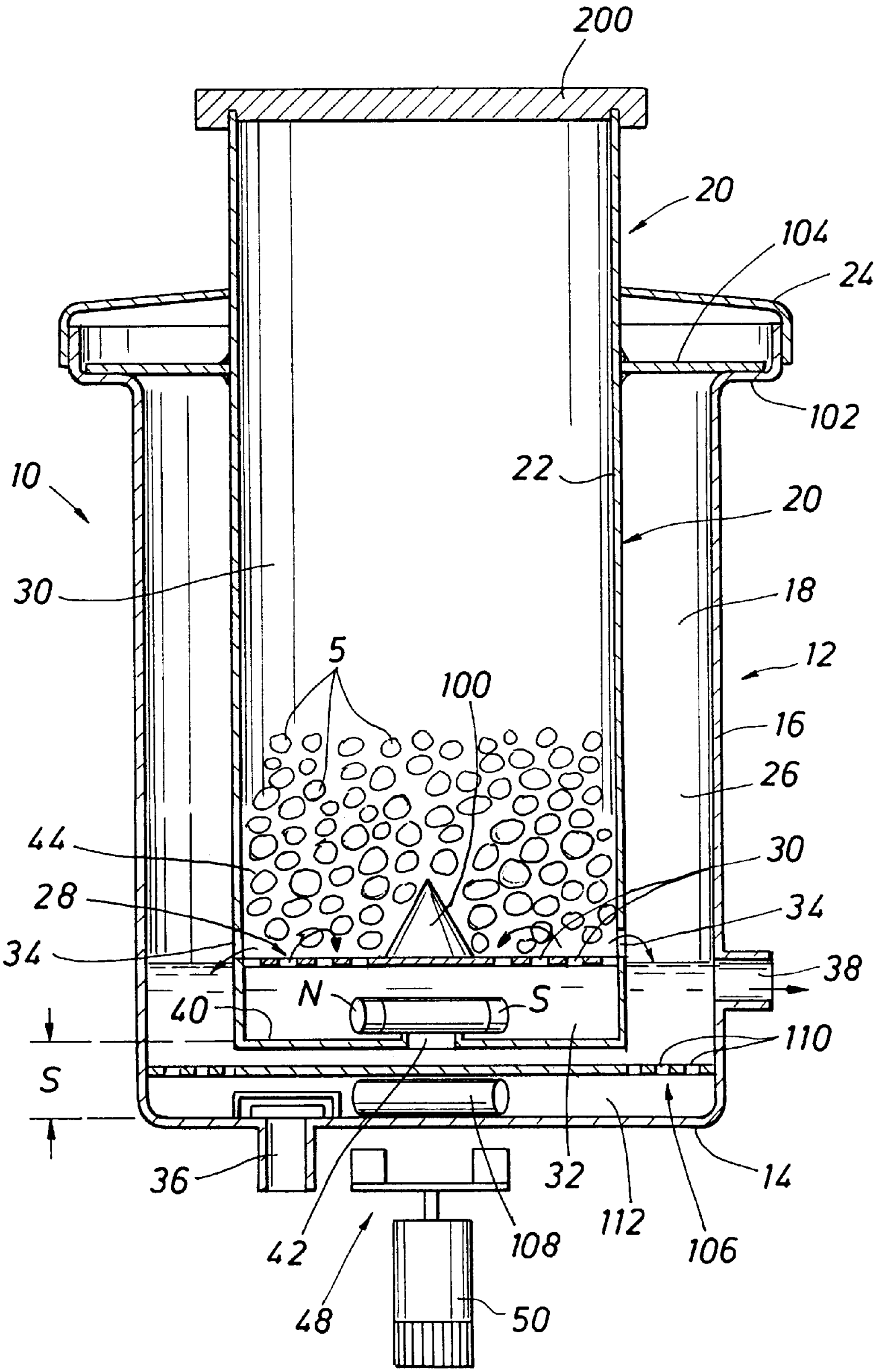
FIG. 6 illustrates an alternative variation of the embodiment of the arrangement of FIG. 1.

FIG. 6 illustrates a variable speed motor 50 powered version of the invention which includes a vertical cylindrical canister or container 20 arranged and designed to contain a variable quantity of solid chemical tablets 5 which have been pressed into various shapes, depending on the type and manufacture of the chemical to be dissolved. Typical shapes of tablets for water disinfection, for example, are either round tablets of various diameters and thickness or pillow shaped biscuits. These tablets are placed randomly into the column 1 from the opening at the top of the column (which may be closed with a container lid 200) and are supported on a horizontal grid or sieve plate 28 that contains a plurality of holes 30 placed in circular patterns from the center. The diameter of the holes 30 varies with the largest diameter holes closest to the center of the contact plate adjacent to a centering cone or defector 100 and the smaller diameter holes placed radially outwardly in the plate. The centering deflector 100, conical in shape, causes chemical tablets in the container 20 to fall away from the center of the grid 28 so that liquid from radially outwardly holes 34 in side walls 22 can flow to and against and around the lower-most tablets supported on grid 28.

The grid plate holes 30 of grid 28 provide for the circulation of liquid from mixing chamber 32 to the liquid dissolving zone 44, while a portion of the eroding fluid containing dissolved chemical flows through the radial holes 34 spaced at equal angular distances around the entire circumference of container 20 and into the collection reservoir 26. A portion of the eroding fluid drains back through the larger of the holes 30 located toward the center of the grid 28, where it is mixed with and combined with treated and untreated liquid being drawn into the mixing chamber 32 via hole or mixing chamber inlet 42 at the bottom 40 of the mixing chamber 32. The liquid swirls in a circular motion because of the turning of the magnetic stirring bar 46 which circulates the liquid in the mixing chamber 32. The stirring bar 46 is magnetically coupled to the driving magnetic bar 48 driven by variable speed motor 50. The water in the mixing chamber, as a result of the swirling, circular motion, forms a vortex shape, with the water level about the exterior walls of chamber 18 rising to a level such that it is forced upward into the liquid dissolving zone 44 of the container 20 and over and around chemical tablets 5 at the bottom of the grid 28. The liquid then drains down the radially inward holes 30 of grid 28 back into the center of the vortex in mixing chamber 32.

The stirring bar 42 contains two magnets placed inside mixing chamber 32 at opposite ends of the bar, one of a positive or "north" polarity N, and the other at the other end of opposite or "south" polarity S. The magnetic stirring bar 42 is set into motion by corresponding magnets of driving magnetic bar 48 located below the base 14 of the housing 12. Since the magnets of driving magnetic bar 48 attract the opposite polarity magnets in the magnetic stirring bar 42, the magnetic stirring bar 42 rotates at the same speed as the variable speed motor 50. The speed of both the driving magnetic bar 48 and the magnetic stirring bar 42 can be adjusted by adjusting the speed of the motor 50. A higher speed results in a higher vortex and more dissolving fluid over and against the chemical tablets 5, and vice versa.

The combined mixture of concentrated solution from mixing chamber 32 via radial discharge holes 34 and untreated liquid from inlet 36 in the collection reservoir is blended, and the liquid level rises in collection reservoir 27. Treated liquid is discharged through gravity discharge outlet 38 and is then directed to either the suction inlet of a pump for pressurized delivery or to a gravity feed line into various process streams where the treated chemical liquid is utilized. Swimming pools, irrigation systems with open reservoirs where pumps take suction for distribution, and waste treatment basins are typical applications where a gravity flow system is applicable.

The embodiment of FIG. 6 includes the container 20 with an annular ring 104 which is mounted on a lip 102 of the housing 12. Such mounting avoids the bottom 40 of the container from having a bottom ring (such as ring 114 of FIG. 1) and provides a space 112 (positioned a distance S between the bottom 40 of container 20 and the base 14 of the housing). A solids separation pate 106 having perforations 110 inhibits solids from falling to the bottom of the housing. An optional secondary stir bar 108, magnetically coupled to driving magnetic bar 48 circulates fluid in spare 112 in a vortex pattern such that liquid rises thereby tending to prevent solids from falling to the base 14. The fresh water inlet 36 is also arranged to enter the space 112 in a direction tangential to a radius of the space 112, to create circular surging of the reservoir, thereby enhancing the circulating fluid vortex creating motion of the fluid in space 112 to carry such solids outwardly and upwardly.

Fluid from the collection reservoir also enters the mixing chamber 32 via hole 42 in the bottom 40 of container 20.

Although the dissolution process may be controlled manually as described above, FIG. 7 illustrates how several of the embodiments (for example, that of FIG. 2 or 3 or 6) of the invention may be arranged to define a system which varies the dissolution process automatically by generating feedback signals from either a meter 206 that measures process flow rate in a process line 200 (for example, gallons per minute in an upstream portion 202 of untreated liquid) and/or from a residual measurement probe 208 in a downstream portion 204 of the line which measures the chemical level or "residual" within the process stream.

Such signals are applied to a processor (e.g., a digital computer 210 or specialized circuitry or devices) which determine a variable control signal S on lead 211 as a function of the flow rate signal on lead 209, the residual measurement signal on lead 210, and a user input signal on lead 213. The signal S is applied to a variable speed motor 50, for example, of the apparatus 201 which varies the erosion rate of chemical tablets 5 as a function of the speed of the motor 50 and the constant flow rate of untreated liquid via inlet 3. The treating liquid via outlet 38 is either applied directly to downstream line 204 or is applied via pump 220 where requirements of pressure of this downstream line require.

The invention provides an apparatus for manual or automatic operation and control as described above for variable chemical injection rates of constant flow rate systems, and it includes the method of producing a treated liquid solution from chemical tablets, injecting that treated solution into a process line, and controlling the chemical level within the process line.

Advantages Of The Apparatus of FIGS. 1–7

1. The invention embodied in the arrangements of FIGS. 1–7 dissolves solid chemical tablets 5 by passing a fixed flow rate of fluid through a housing 12 that is capable of varying the dissolution rate by circulating part of the flow internally before discharging the entire amount from the housing 12. The systems of FIGS. 1–4, and 6 are constant flow rate—variable chemical injection rate system. The system of FIG. 5 injects chemical proportional-to-flow rate for a fluid powered system. The solution concentration can be infinitely variable from no dissolution at all, to very heavy concentrations.

2. The invention embodied in the arrangements of FIGS. 1–7 provides a vortex of liquid within a mixing chamber 32 creating an uneven pressure beneath a perforated grid 28 as a function of radial distance, on which chemical tablets 5 are placed, causing fluid to pass more aggressively through the holes located at the farthermost edge of the grid plate, and simultaneously creating a negative pressure in the larger holes located toward the center of the perforated grid plate 28 which causes the fluid to circulate from outwardly to inwardly against and about the chemical tablets 5. The greater the force generated by a motive force being utilized, (magnetic mixer, motor driven mixer or external pump), the greater the circulation, which results in more aggressive erosion against the solid chemical tablets 5 with a higher resulting concentration of chemical in the fluid of the collection reservoir 26. Part of the fluid above the perforated grid 32 is discharged via holes 34 to the outside of the collection reservoir 26, and part of such fluid is re-circulated directly back to the mixing chamber 32.

3. The arrangement of the invention combines an upper chamber or storage area 30 for chemical tablets in a vertical container 20, a lower or mixing chamber 32 and a collection reservoir 26 into a single vessel.

4. Through the action of a vortex generated when the apparatus begins operation, the liquid is raised from a level beneath the solid chemical tablets 5 to a level which is in contact with the chemical tablets automatically. When untreated liquid input stops, the liquid level automatically returns to a lower level leaving the solid chemical tablets above the water level of the mixing chamber 32. Since the system includes all three parts of the system as described above in advantage 3, there is no period of "zero" treated output when the system starts. Prior systems drain completely, and upon re-starting, require a period to refill and stabilize before treatment of the process flow can return.

5. The invention of the embodiment of FIG. 5 uses the energy of flowing fluid in order to both power and control the dissolution process.

6. When used with a process controller and feedback from either process flow indicators or residual indicators, the arrangements of this invention provide automatic compensation for variances in chemical tablets, temperature, and demands of chemical levels in the process flow.

7. Because the arrangements of the invention are capable of varying the intensity of dissolution of chemical tablets without changing flow rate of liquid flowing through it, an apparatus and method is provided which is capable of dissolving much greater volumes of solid chemical tablets in a smaller diameter storage vessel. Other systems rely on both changing the flow rate dramatically and increasing the total area of solid chemical tablets exposed by making the storage areas much larger in diameter. As a result, the arrangements of the invention are capable of dissolving much smaller volumes of the solid chemical tablets at any one time.

Figure 7:
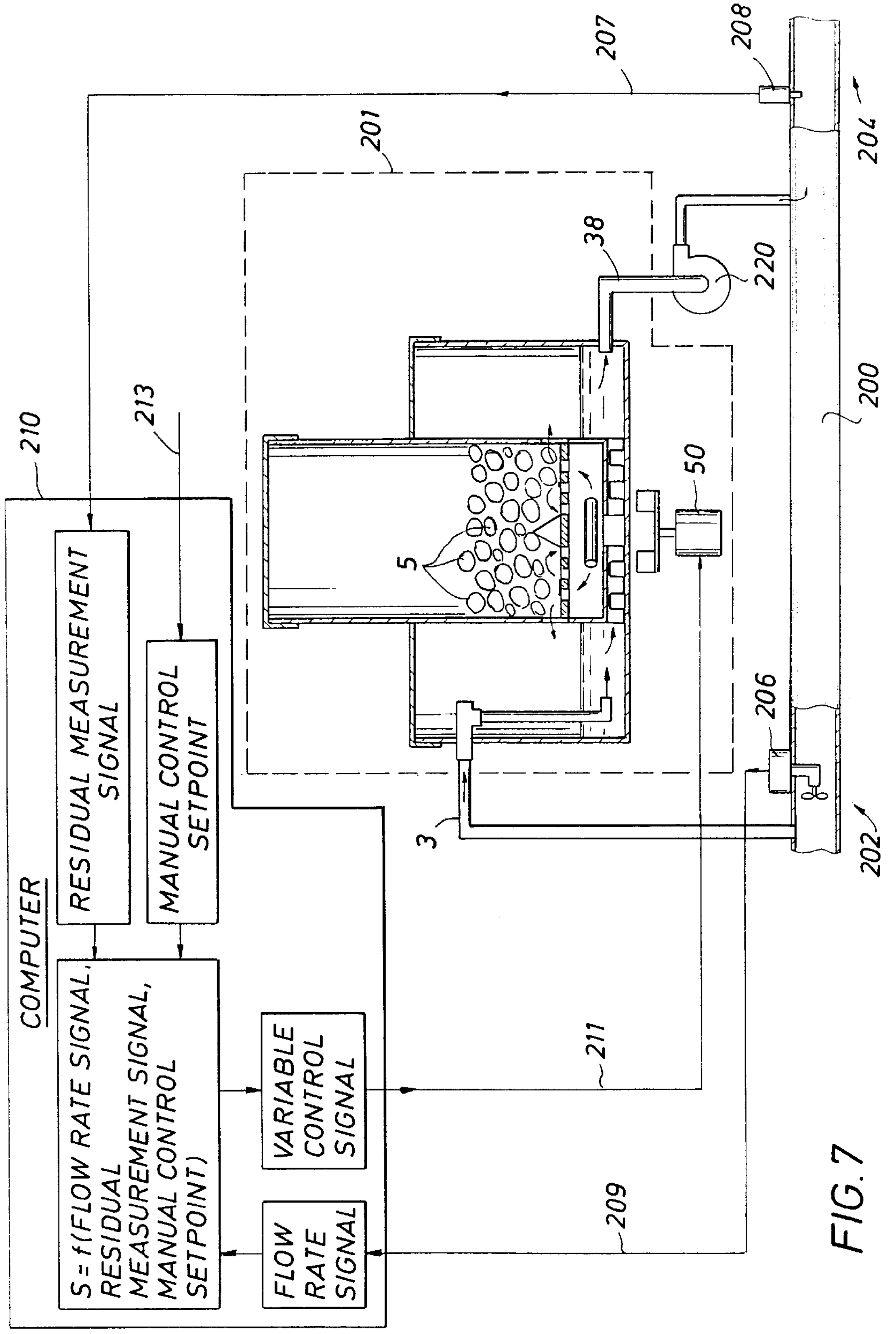
FIG. 7 illustrates an automatic feedback arrangement for several of the embodiments of the invention of this specification whereby dissolution rate is controlled by a control set point processor which receives feedback signals from a process flow rate meter on the inlet side of a process line and/or a residual measurement probe on the outlet side of the process line.
Figure 7A:
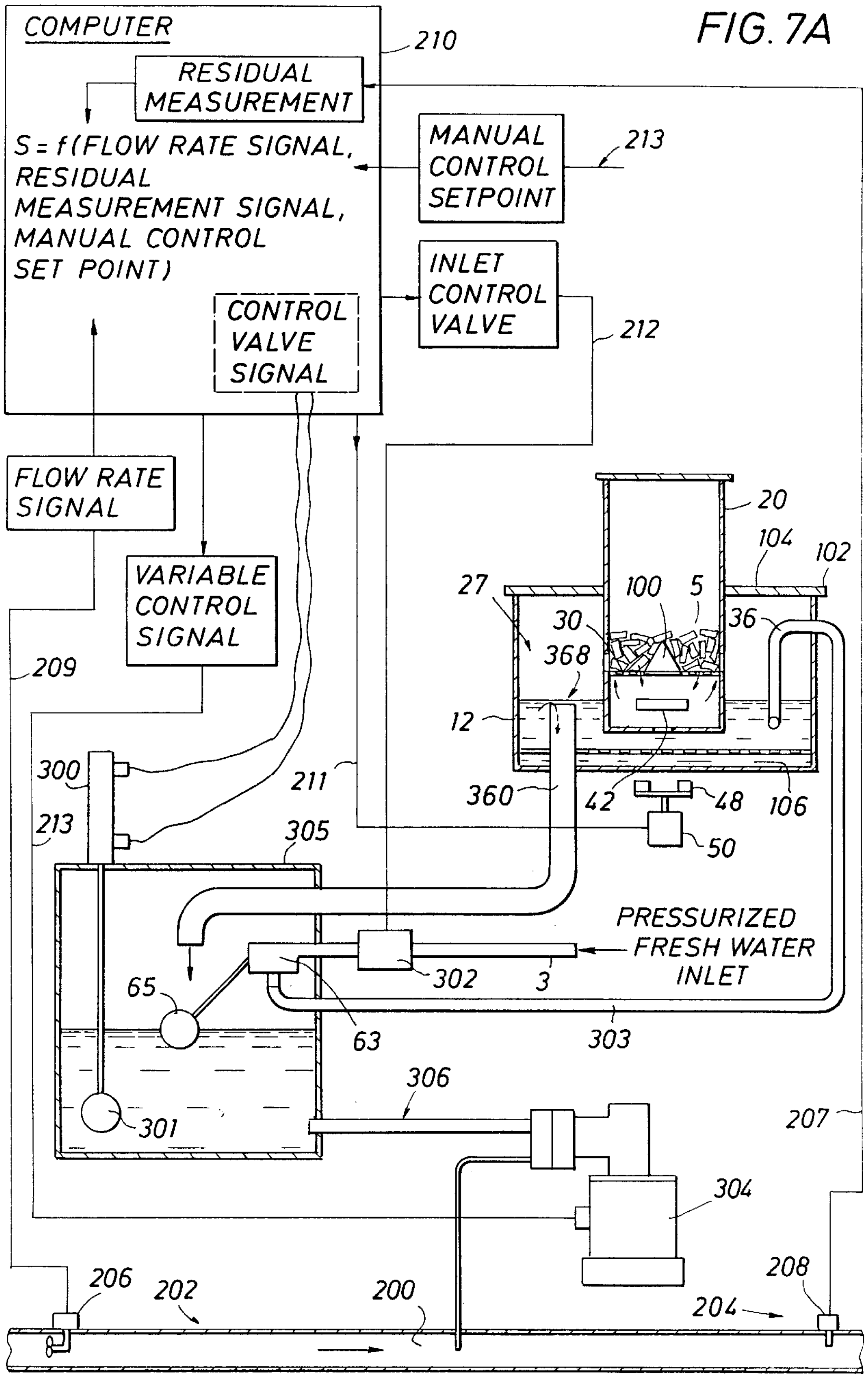
FIG. 7A illustrates a two stage system by which not only chemical treating solution concentration can be controlled but also the volume output of treating solution without changing the amount of liquid entering the system.

Description of Multiple Stage System of FIG. 7A

FIG. 7A illustrates an enhanced version of the arrangement as illustrated in FIG. 7. In the system of FIG. 7A, motor 50 is controlled to produce a fixed concentration of chemical treated liquid that is delivered into a batch tank 305. Untreated liquid is introduced to collection reservoir 27 at inlet 3, passing through solenoid valve 302 and float valve 63 where the discharge of float valve 63 is captured and routed to inlet 36. Float valve 63 acts as a secondary automatic level control which prevents overfilling of batch tank 305.

When the liquid level in solution collection reservoir 27 rises to the top of discharge pipe 360, the fluid drains by gravity into the opening 368 and is discharged into batch tank 305. When the level of dissolved solution reaches a pre-set point in batch tank 305, float 301 is raised to actuate proximity switch 300 which signals the computer 210 to generate a control signal on lead 212 to close solenoid valve 302, stopping the flow of incoming untreated liquid to the system. Dissolved chemical in batch tank 305 is delivered to variable speed injection pump 304 through line 306. Variable speed injection pump 304 delivers the necessary amount of chemical solution to process line 200 and is controlled by the computer 210 sensing either process line flow rate from meter 206 via lead 209 and/or residual chemistry level from residual probe 208 via lead 207. As the residual level or flow rate changes within line 200, the computer 210 changes the speed of motor 304 via a variable control signal on lead 213 to deliver more or less volume of treating liquid in order to maintain the manual set point applied on lead 213. This configuration of the invention is different from that illustrated in FIGS. 1, 2, 3, 4, 5, and 6, in that although the concentration of treated liquid can be changed through the adjustment of magnetic drive motor 50, that setting normally remains constant, and the desired amount of chemical treated liquid delivered then becomes a function of the quantity of chemical treating liquid in tank 305 delivered rather than changing the strength or concentration of the solution by varying the chemical concentration of liquid in reservoir 27.

As the variable speed injection pump 304 delivers solution from batch tank 305, the level in the batch tank is monitored by float 301 which operates high and low level proximity switches 300. A unique feature of this arrangement provides for positive fluid level control in collection reservoir 27 by adjustment of the height of opening 368 in discharge pipe 360 thereby making overfilling impossible. Another advantage is that needed changes in chemical residual can be made instantly, because the speed of the injection pump 304 responds immediately to changes of variable control signal on lead 213 and thereby quickly changes the amount of chemical treating liquid being injected into line 200. As variables such as temperature, chemical demand in the process stream, and variations in chemical strength occur, the computer 210 adjusts the speed of the injection pump 304 to compensate by changing the quantity of chemical treating liquid being delivered. Overall output of the system can be further adjusted by adjusting the dissolved chemical concentration or solution strength that is being produced by adjusting the speed of magnetic stir bar motor 50. The capability to adjust both the concentration of chemical treating solution (output from pipe 360) and the volume of chemical treating solution from tank 305 delivered provides a single system that is capable to cover a wide range of performance. In the case of drinking water treatment, the system can be adjusted to treat very low flow rates of as low as 10 GPM to as high as 2000 GPM, all with the same system because all factors of system performance are easily adjusted. This same configuration may be utilized using only manual controls to set the output of the system without a computer that senses residual or flow rate in the line.

As described above, the system of FIG. 7A provides a chemical feeder dissolution system with the capability of changing chemical treating liquid concentration and its volume output without changing the flow rate of liquid into the feeder. If a greater volume of chemical treating liquid from tank 305 is required, the computer 210 (or by manual control) simply controls pump 304 to produce more "batches" of the chemical treating liquid with the only limit being that the final solution pump 304 cannot be adjusted to deliver more liquid than the incoming volume via inlet 3. Even that limitation can be changed by increasing flow into the system. Therefore, as described above, system performance of the system of FIG. 7A can be changed by adjusting first the volume of the incoming liquid, then the intensity of the stirring action, and then the volume of treated chemical solution output.

While preferred embodiments of the present invention have been illustrated and/or described in some detail, modifications and adaptions of the preferred embodiments will occur to those skilled in the art. However, it is to be expressly understood that such modifications and adaptations are within the spirit and scope of the present invention as set forth in the claims.

What is claimd is:

1. Apparatus for delivering a solution of a solid chemical material which includes a housing (12) having a base (14)

and upwardly extending side walls (16), said base (14) and side walls (16) defining a cavity (18), an elongated substantially vertical hollow container (20) positioned within said cavity (18), said container having side walls (22) which are spaced from said side walls (16) of said housing, a lid (24) connecting an upper terminus of the side walls (16) of the housing to the container (20), thereby defining a collection reservoir (26) between said container (20) and said housing (12), a grid (28) having a plurality of perforations (30) mounted within said container (20) below said lid (24) but spaced from and substantially parallel to said base (14), said grid (28) arranged and designed for supporting treating tablets of solid dissolvable chemical material which is soluble in liquid, said grid (28) dividing said container (20) into an upper chamber (30) and a lower chamber (32), the side walls (22) of said container (20) between said lid (24) and said grid (28) having a plurality of radially arrayed openings (34) that permit liquid communication between said upper chamber (30) and said collection reservoir (26), characterized in that, a collection chamber inlet (36) from a source of untreated liquid extends into said collection reservoir (26), and an outlet (38) to a line for treated liquid extends into said collection reservoir (26), said container (20) having a bottom (40) spaced from said base (14) of said housing (12) and having a hole (42) in said base (14) to allow liquid communication between said collection reservoir (26) and said lower chamber (32), and means for creating a liquid vortex in said lower chamber (32) whereby liquid rises radially outwardly in said lower chamber (32) through radially outward perforations of said grid (28), and impinges on said treating tablets (5) in said upper chamber (30) for dissolving said chemical in said liquid and forming a liquid dissolving zone (44) above said grid (28), with a portion of said liquid in said liquid dissolving zone (44) communicating with said collection reservoir (26) via said radially arrayed openings (34) and with another portion of said dissolved liquid returning to said lower chamber (32) via radially inward perforations of said grid (28).

2. The apparatus of claim 1, wherein said means for creating a liquid vortex in said lower chamber (32) includes a stir bar (46) in said lower chamber (32) magnetically coupled to a driving bar (48) positioned below said base (14) of said housing (12), whereby rotation of said driving bar (48) causes said stir bar (46) to rotate in said lower chamber (32) for creating said liquid vortex.

3. The apparatus of claim 2, wherein said driving bar (48) is arranged and designed for variable speed rotation for controlling rotation speed of said stir bar and the energy of said liquid vortex, whereby a rate of dissolution of said treating tablets in said upper chamber (30) and the amount of dissolved chemical in said collection reservoir (26) is variable as a function of said driving bar rotation speed.

4. The apparatus of claim 3, wherein the flow rate of untreated liquid from said collection inlet (36) is substantially equal to the flow rate of treated liquid outlet via said outlet (38), whereby said apparatus is characterized by constant liquid flow rate with variable chemical dissolution rate.

5. The apparatus of claim 2, wherein said drive bar (48) is coupled to an electric motor (50).

6. The apparatus of claim 5, wherein said speed of said electric motor is variable.

7. The apparatus of claim 2, wherein said driving bar (48) is coupled to a turbine (52) positioned in a turbine housing (54) placed beneath said lower chamber (32), said turbine housing (54) having a driving liquid inlet (56) and a turbine housing discharge outlet (58), a turbine input fluid line (60) having a first end and a second end, with a first end of said turbine fluid line connected to said driving liquid inlet (56), a three way valve (61) connected among an untreated liquid input line (3), said first end of said turbine input fluid line (60) and said collection chamber inlet (36), a turbine output fluid line (62) having a first end connected to said turbine housing dicharge outlet (58) and a second end in fluid connection with said collection reservoir (26), whereby adjustment of said three way valve (61) varies the flow rate of liquid through said turbine (52), which varies the speed of said driving bar (48) and said stir bar (46) magnetically coupled thereto, and a rate of dissolution of said treating tablets (5) in said upper chamber (30), and the amount of dissolved chemical in said collection reservoir (26) is variable as a function of a position of said three way valve (61), while the flow rate of untreated liquid from said input line (3) is substantially equal to the flow rate of treated liquid output via said outlet (38).

8. The apparatus of claim 2 further including, a float valve (63) placed between an inlet (3) of untreated liquid and said collection chamber inlet (36), and a float (65) positioned in said collection reservoir (26) and coupled to said float valve (63), whereby liquid level in said collection reservoir (26) is maintained at a substantially constant level when untreated liquid is flowing into said collection chamber inlet (36).

9. The apparatus of claim 2 further including, a liquid flow line (88) having a turbine power driver (90) inserted in said flow line, said power driver (90) having an output shaft (92) which is driven at a rate proportioned to a flow rate of liquid through said flow line (88), said magnetic stir bar (48) coupled to said output shaft (92), a pump (94) coupled to said output shaft (92), said outlet (38) being in fluid communication with said liquid flow line (88) through said pump, whereby dissolution rate of chemical inserted into said flow line is proportional to the flow rate of liquid in said flow line (88).

10. The apparatus of claim 9 further comprising a variable speed gear (99) which couples said magnetic stir bar (48) and said pump (94) to said output shaft (92) of said turbine power driver (90).

11. The apparatus of claim 2, wherein said housing (12) includes a lip (102), said container (20) includes an annular ring (104) and said container (20) is supported within said housing (12) by said annular ring (104) on said lip (102) and is arranged and designed to provide a space (112) in said collection reservoir (26) between said bottom of container (40) and said base (14) of said housing (12).

12. The apparatus of claim 11 further including a deflector (100) positioned centrally on a top side of said grid, whereby treating tablets which are supported on said grid are forced into an annular region around said deflector thereby inhibiting bridging of said tablets as they are dissolved.

13. The apparatus of claim 2, wherein a solids separation plate (106) is placed in said collection reservoir (26) between said bottom of container (40) and said base (14) of said housing, said plate (106) having perforations (110) which are arranged and designed to allow liquid communication therethrough while inhibiting solids from falling to said base (14).

14. The apparatus of claim 13, wherein a secondary stir bar (108) is placed between said solids separation plate (106) and said base (14) of said housing (12), said secondary stir bar (108) being magnetically coupled to said driving bar (48), wherein said secondary stir bar (108) when rotated causes swirling of liquid in a space (112) between said solids separation plate (106) and said base (14) which inhibits solids from collecting in said space (112).

15. The apparatus of claim 13, wherein said inlet (36) extends into a space (112) between said solids separation plate (106) and said base (14) of said collection reservoir (26) radially outwardly of a longitudinal axis of said collection reservoir (26) and in a tangential direction thereto to cause swirling of liquid in said space (112) which inhibits solids from collecting in said space (112).

16. The apparatus of claim 13 further including a deflector (100) positioned centrally on a top side of said grid, whereby treating tablets which are supported on said grid are forced into an annular region around said deflector thereby inhibiting bridging of said tablets as they are dissolved.

17. The apparatus of claim 1, wherein said means for creating a liquid vortex in said lower chamber (32) includes a pipe (68) disposed in said collection reservoir (26), said pipe having an outlet (70) directed tangentially toward an inner wall (31) of said lower chamber (32), said pipe having an inlet (72) in liquid communication with liquid in said collection reservoir (26), a propeller (74) disposed in said inlet (72) of said pipe (68), and a variable speed motor (76) having an output shaft (78) coupled to said propeller (74), thereby creating said liquid vortex.

18. The apparatus of claim 17 further including a float valve (63) placed between a line (3) of untreated liquid and said collection reservoir inlet (36), and a float (65) positioned in said collection reservoir (26) and coupled to said float valve (63), whereby liquid level in said collection reservoir (26) is maintained at a substantially constant level when untreated liquid is flowing into said collection chamber inlet (36).

19. The apparatus of claim 1, wherein said means for creating a liquid vortex in said lower chamber (32) includes a vortex creating pipe (68A) at least partially disposed in said collection reservoir (26), said pipe (68A) having an outlet (70A) directed tangentially toward the inner wall (31) of said lower chamber (32), said pipe (68A) having an inlet (80), an output pipe (82) in fluid communication with liquid in said collection reservoir (26), a pump (84) having an input in fluid communication with said outlet pipe (82) and a pump output outlet (85), a connecting pipe (86) in fluid communication between said pump outlet (85) and said inlet (80) of said vortex creating pipe (68A), whereby liquid from said collection reservoir (26) is pumped under pressure via said pump (84) and said pipes (82), (86) and (68A) from said collection reservoir (26) to swirl in said lower chamber (32) thereby creating said liquid vortex.

20. The apparatus of claim 19 further including a three way valve (61A) having an inlet in fluid communication with said connecting pipe (86), a first outlet in fluid communication with said inlet (80) of said vortex creating pipe (68A) and a second outlet in fluid communication with a bypass pipe (88) which has an outlet which opens into said collection reservoir (26), whereby, said three way valve (61A) is arranged and designed for adjustment to divert flow of pressurized outlet chamber liquid from said pump (84) and said pipe (86) to said collection reservoir (26), thereby providing a variable flow of liquid into said lower chamber (32) via said vortex creating pipe (68A) and a variable level of energy of said liquid vortex, with the result that a rate of dissolution of said treating tablets (5) in said upper chamber (30) and the amount of dissolved chemical in said collection reservoir (26) is variable as a function of said adjustment of said three way valve (61A).

21. The apparatus of claim 19 further including a float valve (63) placed between a line (3) of untreated liquid and said collection reservoir inlet (36), and a float (65) positioned in said collection reservoir (26) and coupled to said float valve (63), whereby liquid level in said collection reservoir (26) is maintained at a substantially constant level when untreated liquid is flowing into said collection chamber inlet (36).

22. The apparatus of claim 1 further including a deflector (100) positioned centrally on a top side of said grid, whereby treating tablets which are supported on said grid are forced into an annular region around said deflector (100) thereby inhibiting bridging of said tablets as they are dissolved.

23. The apparatus of claim 1, wherein said bottom (40) of said container (20) includes a hollow ring (114) having radially extending holes (116) designed and arranged to provide fluid communication between said collection reservoir (26) and said hole (42) in said bottom (40) of container.

24. The apparatus of claim 23 further comprising a locator ring (118) disposed on said based (14) of said housing (12), said locator ring (118) being arranged and designed to orient said hollow ring (114) of said bottom (40) of said container (20) centrally within said housing (12).

25. Apparatus for delivering a solution of a solution of a solid chemical material which includes a housing (12) having a base (14) and upwardly extending side walls (16), said base (14) and side walls (16) defining a cavity (18), an elongated substantially vertical hollow container (20) positioned within said cavity (18), said container having side walls (22) which are spaced from said side walls (16) of said housing, a lid (24) connecting an upper terminus of the side walls (16) of the housing to the container (20), thereby defining a collection reservoir (26) between said container (20) and said housing (12), a grid (28) having a plurality of perforations (30) mounted within said container (20) below said lid (24) but spaced from and substantially parallel to said base (14), said grid (28) arranged and designed for supporting treating tablets of solid dissolvable chemical material which is soluble in liquid, said grid (28) dividing said container (20) into an upper chamber (30) and a lower chamber (32), the side walls (22) of said container (20) between said lid (24) and said grid (28) having a plurality of radially arrayed openings (34) that permit liquid communication between said upper chamber (30) and said collection reservoir (26), characterized in that, a collection chamber inlet (36) from a source of untreated liquid extends into said collection reservoir (26), and an outlet (38) to a line for treated liquid opens from said collection reservoir (26), said container (20) having a bottom (40) spaced from said base (14) of said housing (12) and having a hole (42) in said base (14) to allow liquid communication between said collection reservoir (26) and said lower chamber (32), and a device for treating said untreated liquid at constant flow rate from said collection chamber inlet (36) and to produce a treated liquid of a variable chemical dissolution rate of treating chemical material which is soluble in said untreated liquid via said outlet (38).

26. The apparatus of claim 25, wherein said device includes means for creating a liquid vortex in said lower chamber (32) whereby liquid rises radially outwardly in said lower chamber (32) through radially outward perforations of said grid (28), and impinges on said treating tablets in said upper chamber (30) for dissolving said chemical in said liquid and forming a liquid dissolving zone (44) above said grid (28), with a portion of said liquid in said liquid dissolving zone (44) communicating with said collection reservoir (26) via said radially arrayed openings (34) and with another portion of said dissolved liquid returning to said lower chamber (32) via radially inward perforations of said grid (28).

27. Apparatus for delivering a solution of a solid chemical material including a container (20) divided into upper (30) and lower (32) chambers by a perforated grid (28), said grid arranged and designed for supporting chemical tablets (5) in said upper chamber (30), a housing (12) in which said container is disposed which defines a collection reservoir (26) external to walls (22) of said container (30) and internal to walls (16) of said housing (12), a first fluid communication path in said walls of said container by which at least a portion of liquid in said upper chamber (30) passes to said collection reservoir (26), a second fluid communication path in said lower chamber (32) of said container (20) by which liquid may pass between said lower chamber (32) and said collection reservoir (26), an inlet into said collection reservoir by which untreated liquid enters the collection reservoir (26), an outlet (38) from said collection reservoir by which treated liquid exits the collection reservoir (26) at the same rate that liquid enters the collection reservoir (26) from said inlet, means for creating a controlled variable intensity vortex of liquid in said lower chamber, where said vortex of liquid resembles a hollow cylinder of water with water rotating tangentially to the walls of said lower chamber, by which liquid therein rises through radially outward perforations in said grid, impinges on tablets in said upper chamber, and at least partially returns to said lower chamber via radially inward perforations in said grid (28), whereby the rate of dissolution of said chemical tablets (5) is proportional to said intensity of said vortex of liquid, and said apparatus is characterized by substantially constant flow rate of liquid between said inlet and said outlet with a controllable variable rate of chemical dissolution in said outlet liquid flow.

28. In an apparatus for delivering a solution of a solid chemical material which includes a container (20) divided into upper (30) and lower (32) chambers by a perforated grid (28), said grid arranged and designed for supporting chemical tablets (5) in said upper chamber (30), a housing (12) in which said container is disposed which defines a collection reservoir (26) external to walls (22) of said container (20) and internal to walls (16) of said housing (12), a first fluid communication path in said walls of said container (20) by which at least a portion of liquid in said upper chamber (30) passes to said collection reservoir (26), a second fluid communication path in said lower chamber (32) of said container (20) by which liquid may pass between said lower chamber (32) and said collection reservoir (26), an inlet into said collection reservoir by which untreated liquid enters the collection reservoir (26), an outlet (38) from said collection reservoir by which treated liquid exits the collection reservoir (26) at the same rate that liquid enters the collection reservoir (26) from said inlet, a method for treating untreated liquid which flows into said collection reservoir at an input flow rate comprising the steps of adjusting an output flow rate of treated liquid from said collection reservoir to be substantially the same as an input flow rate of untreated liquid into said collection reservoir, creating a vortex of liquid in said lower chamber, where said vortex of liquid resembles a hollow cylinder of water with water rotating tangentially to the walls of said lower chamber, by which liquid rises through radially outward perforations in said grid, and impinges on tablets in said upper chamber, and at least partially returns to said lower chamber via radially inward perforations in said grid, controlling the intensity of said vortex whereby the rate of dissolution of said chemical tablets is proportional to said intensity of said vortex of liquid.

29. Apparatus for producing a solution of a solid chemical material including a container (20) divided into upper (30) and lower (32) chambers by a perforated grid (28), said grid arranged and designed for supporting chemical tablets (5) in said upper chamber (30), a housing (12) in which said container is disposed which defines a collection reservoir (26) external to walls (22) of said container (30) and internal to walls (16) of said housing (12), a first fluid communication path in said walls of said container by which at least a portion of liquid in said upper chamber (30) passes to said collection reservoir (26), a second fluid communication path in said lower chamber (32) of said container (20) by which liquid can pass between said lower chamber (32) and said collection reservoir (26), means for creating a controlled variable intensity vortex of liquid, where said vortex of liquid resembles a hollow cylinder of water with water rotating tangentially to the walls of said lower chamber, in said lower chamber by which liquid therein rises through radially outward perforations in said grid, impinges on tablets in said upper chamber, and at least partially returns to said lower chamber via radially inward perforations in said grid (28), whereby the rate of dissolution of said chemical tablets (5) is proportional to said intensity of said vortex of liquid.

30. The apparatus of claim 29 wherein said means for creating a controlled variable intensity of liquid in said lower chamber includes, a source of pressurized liquid, a pipe in fluid communication with said source of pressurized liquid, said pipe having an outlet directed tangentially toward an inner wall of said lower chamber, wherein tangential flow of pressurized liquid creates said vortex of liquid in said lower chamber, and an outlet from said collection reservoir.

31. The apparatus of claim 30 further comprising a three way valve arranged and designed to divert a portion of said pressurized liquid to said collection reservoir (26), thereby providing a variable flow of liquid to said pipe.

32. In an apparatus for delivering a solution of a solid chemical material which includes a container (20) divided into upper (30) and lower (32) chambers by a perforated grid (28), said grid arranged and designed for supporting chemical tablets (5) in said upper chamber (30), a housing (12) in which said container is disposed which defines a collection reservoir (26) external to walls (22) of said container (20) and internal to walls (16) of said housing (12), a first fluid communication path in said walls of said container (20) by which at least a portion of liquid in said upper chamber (30) passes to said collection reservoir (26), a second fluid communication path in said lower chamber (32) of said container (20) by which liquid may pass between said lower chamber (32) and said collection reservoir (26), a method for treating pressurized liquid applied to said lower chamber comprising the steps of applying at least a portion of said pressurized liquid tangentially to the inner walls of said lower chamber, thereby creating a vortex of liquid in said lower chamber, where said vortex of liquid resembles a hollow cylinder of water with water rotating tangentially to the walls of said lower chamber, by which liquid rises through radially outward perforations in said grid, and impinges on tablets in said upper chamber, and at least partially returns to said lower chamber via radially inward perforations in said grid, and controlling the intensity of said vortex whereby the rate of dissolution of said chemical tablets is proportional to said intensity of said vortex of liquid.

* * * * *

UNITED STATES PATENT AND TRADEMARK OFFICE

CERTIFICATE OF CORRECTION

PATENT NO. : 6,337,024 B1
DATED : January 8, 2002
INVENTOR(S) : Hammonds

It is certified that error appears in the above-identified patent and that said Letters Patent is hereby corrected as shown below:

Column 2,
Line 46, delete "undesolved", insert -- undissolved --

Column 7,
Line 61, delete "pate", insert -- plate --
Line 64, delete "spare", insert -- space --

Column 10,
Line 65, delete "claimd," insert -- claimed --

Column 14,
Line 55, delete "based", insert -- base --

Signed and Sealed this

Eighteenth Day of June, 2002

*Attest:*

JAMES E. ROGAN

*Attesting Officer*

*Director of the United States Patent and Trademark Office*